Jan. 5, 1971     E. M. HAWES     3,552,194

SOIL PENETRATION AND SHEAR MEASURING INSTRUMENT

Filed July 12, 1968     2 Sheets-Sheet 1

INVENTOR
EDWARD M. HAWES
BY Barthel & Bugbee
ATTORNEYS

Jan. 5, 1971 E. M. HAWES 3,552,194
SOIL PENETRATION AND SHEAR MEASURING INSTRUMENT
Filed July 12, 1968 2 Sheets-Sheet 2

INVENTOR
EDWARD M. HAWES
BY Barthel & Bugbee
ATTORNEYS

United States Patent Office 3,552,194
Patented Jan. 5, 1971

3,552,194
SOIL PENETRATION AND SHEAR MEASURING
INSTRUMENT
Edward M. Hawes, 32418 Birkshire Road,
St. Claire Shores, Mich. 48082
Filed July 12, 1968, Ser. No. 744,359
Int. Cl. G01n 3/14, 3/24; F16h 29/20
U.S. Cl. 73—84                                    9 Claims

ABSTRACT OF THE DISCLOSURE

In this instrument, a sinkage plate attached to a vertical shaft is selectively pushed straight downward for straight penetration or in a spiral path for shear penetration by means of a rotary nut threadedly engaging a rotary fast-thread screw shaft which is selectively connected or disconnected from the nut for unitary or relative motion therebetween by means of a selective clutch. The screw shaft at its upper end is engaged by the lower end of a non-rotatable shaft through a thrust bearing. The non-rotatable shaft is in turn engaged by and subjected to the thrust of a calibrated compression loading spring, the upper end of which is given an initial loading by manually moving downward an upper spring abutment structure carrying a rotary recording drum. The downward motion of the non-rotatable shaft is transmitted through a carriage and motion-multiplying mechanism to a scriber which records the motion on a chart attached to the rotary drum. The resulting graph shows the resistance offered by the ground to the penetration of the sinkage plate either direct or in shear, depending on whether the screw shaft is locked by a clutch against rotation or is unlocked and free to rotate. The recording drum is spring-wound and its rotation is controlled by a flexible cable wound around a portion of the drum and guided downward over a pulley to an anchorage on the substantially immovable base structure of the instrument.

Figure 1:
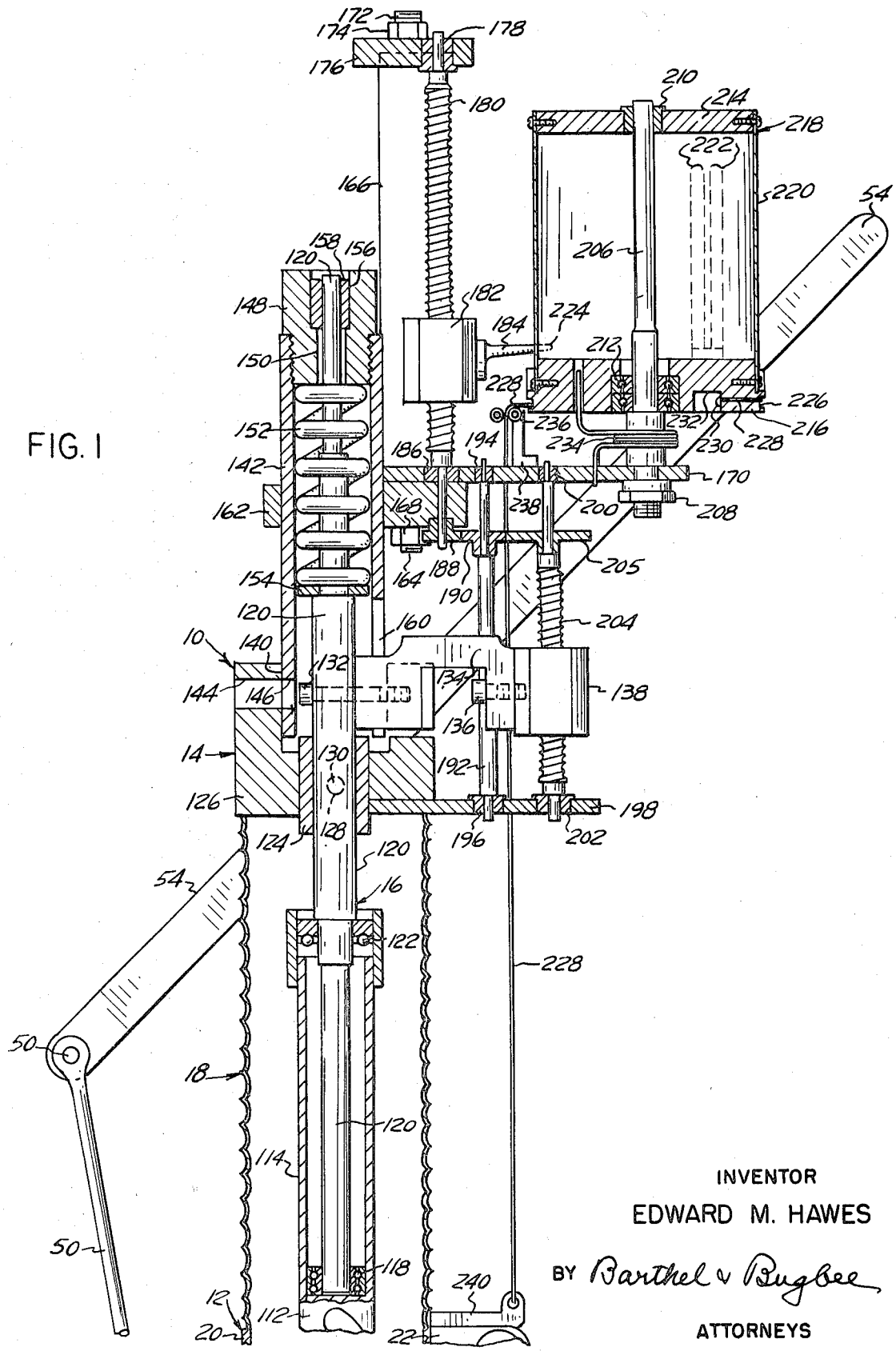
FIG. 1 is a central vertical section, partly in side elevation, through the upper part of a penetration and shear measuring instrument for soils, according to one form of the invention.
Figure 2:
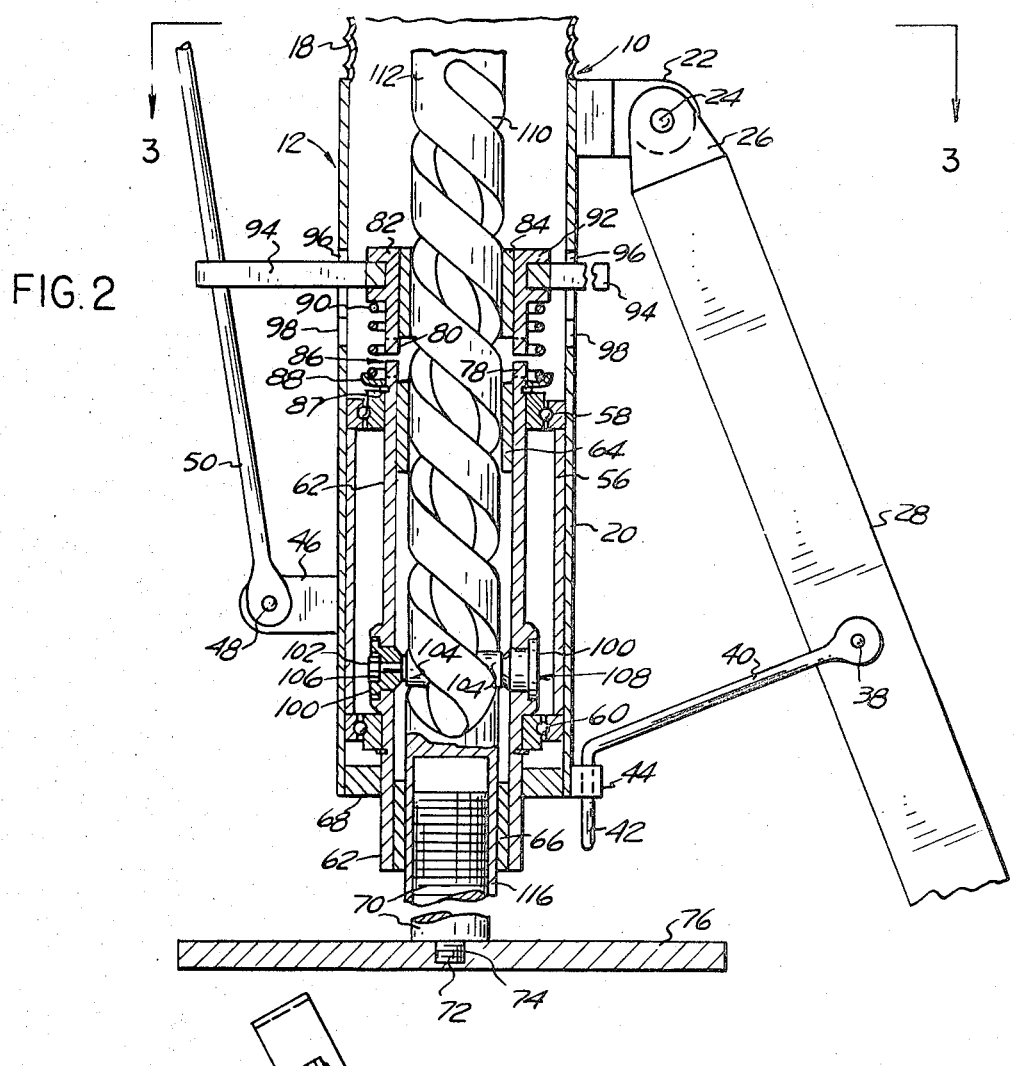
FIG. 2 is a similar view of the lower part of the instrument and forming a downward continuation of FIG. 1, the major part of the sinkage plate supporting shaft being omitted to permit showing the instrument on a larger scale.
Figure 3:
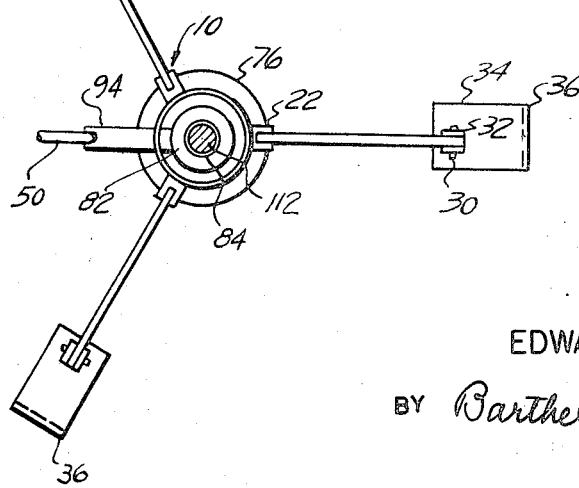
FIG. 3 is a horizontal section upon a reduced scale, taken along the line 3—3 in FIG. 2.

Referring to the drawings in detail, FIGS. 1, 2 and 3 show a penetration and shear measuring instrument, generally designated 10, according to one form of the invention including a stationary lower assembly 12 and a vertically-movable upper assembly 14 interconnected by a coaxial shaft structure 16 and by a flexible collapsible bellows 18 for preventing the entry of dirt, moisture and other foreign matter. The lower assembly 12 includes a stationary tubular lower housing 20 (FIG. 2) having bifurcated leg bracket 22 welded or otherwise secured to the upper end thereof in equally circumferentially-spaced relationship. For the convenience and stability of support upon uneven terrain, three such leg brackets 22 are preferably provided (FIG. 3) and each is drilled to support a horizontal upper pivot pin 24 which in turn pivotally supports the flattened upper end portion 26 of a leg 28, the lower end portion of which is pivotally connected by a horizontal lower pivot pin 30 to upstanding bosses 32 welded or otherwise secured to the upper side of a foot plate 34 having a downturned flange 36 at the outer end thereof. Intermediate its opposite ends, each leg 28 is drilled to receive a pivot pin 38 (FIG. 2) to which is pivotally attached the outer end of a hook 40, the bent inner end 42 of which passes through an apertured keeper 44 whereby, upon removal of the hook 40 from the keeper 44, the leg 28 may be swung inward close to the lower casing 20 for compactness or transportation or storage.

Also secured as by welding to the lower portion of the tubular lower casing 20 is a bracket 46 (FIG. 2) drilled to receive a pivot pin 48 upon which is pivotally mounted the lower end of a swinging link 50. The upper end of the link 50 (FIG. 1) is pivoted at 52 to a hand lever 54 composed of spaced parallel bars, only one of which is shown in FIG. 1 and whose function is described in more detail below.

Mounted within and secured to the lower tubular casing 20 and separated from one another by a tubular spacer 56 are vertically-spaced upper and lower anti-friction bearing units 58 and 60 respectively (FIG. 2), the inner races of which are secured to a rotary tubular shaft 62. Mounted within and secured to a tubular shaft 62 at the upper and lower ends thereof are bushings 64 and 66 respectively. Secured within the lower bushing 66 in an internally-threaded tubular portion 116 described more fully below is the correspondingly-threaded upper end of an elongated sinkage plate 70, the reduced diameter threaded lower end portion 72 of which is threaded into a correspondingly-threaded socket 74 in a sinkage plate 76. The sinkage plate 76 is preferably circular and is also preferably made in several interchangeable sizes or diameters in order to adapt the instrument to the measurement of soils of different conditions of resistance to penetration. Surrounding the tubular shaft 62 and extending between it and the tubular lower housing 20 is a sealing gasket 68.

The upper end of the tubular shaft 62 is provided with lower or fixed jaw clutch teeth 78 (FIG. 2) which are spaced apart circumferentially from one another, the interstices of which are engaged by corresponding movable upper jaw clutch teeth 80 attached to and integral with the lower end of a sliding clutch collar 82 containing a clutch bushing 84 and collectively constituting a jaw clutch 86. The upper end of the tubular shaft 62 is grooved immediately above the upper anti-friction bearing unit to receive a snap ring 87 by which an annular lower clutch spring abutment is held in position. A clutch-disengaging helical compression spring 90 at its lower end engages the lower spring abutment 88 and at its upper end engages the enlarged upper end 92 of the clutch collar 82, normally urging the jaw clutch teeth 78 and 80 apart from one another so as to disengage them. The enlarged upper end 92 of the clutch collar 82 is drilled and threaded at diametrically-opposite locations to receive the correspondingly-threaded inner end of diametrically-opposite clutch operating handles 94 which are slidable in diametrically-opposite vertical bayonet J-shaped slots 96 and movable at the lower ends thereof into circumferentially-extending locking notches 98 to hold the clutch jaws 78 and 80 in clutching engagement against the thrust of the spring 90.

The tubular shaft 62 intermediate its opposite ends and immediately above the lower anti-friction bearing unit 60 is enlarged and drilled and threaded transversely at diametrically-opposite locations to receive the correspondingly - threaded flanged bearing buttons 100 (FIG. 2) which in turn are drilled axially to receive axles 102 of nut rollers 104 rotatably mounted thereon. The outer ends of the axles 102 are threaded to receive retaining nuts 106. The elements 100, 102, 104 and 106 collectively constitute a lockable rotary nut 108, the rollers 104 of which rotatingly engage the helical groove 110 in a fast-thread rotary screw shaft 112 which passes through the clutch bushing 84 in the clutch collar 82 into the tubular shaft 62 and through the upper bushing 64 thereof. The screw shaft 112 extends upward and downward in tubular portions 114 and 116 respectively, the latter being internally-threaded to receive the externally-threaded upper portion of the sinkage plate shaft 70.

Seated within and at the bottom of the upper tubular portion 114 of the screw shaft 112 is a radial anti-friction bearing 118 which rotatably supports the screw shaft 112 relatively to the lower end portion of a stepped non-rotatable shaft 120 which, with the rotary screw shaft 112, forms the coaxial shaft structure 16. The upper ends of the upper tubular portion 114 of the screw shaft 112 engages the lower side of an anti-friction thrust bearing 122, the upper side of which is engaged by the non-rotatable stepped shaft 120 (FIG. 1). The upper non-rotatable shaft 120 passes through a bushing 124 which in turn is seated in a supporting block 126 forming the lower part of the vertically-movable upper assembly 14. The opposite sides of the block 126 and bushing 124 are bored with aligned holes 128 into which project stub pins 130 secured at their outer ends to the parallel bars of the hand lever 54 with the result that swinging of the handle portion at the upper end thereof moves the block 126 and bushing 124 upward or downward, as the case may be, independently of the stepped shaft 120.

At a location spaced above the bushing 124, the stepped shaft 120 is drilled transversely to receive a bolt 132 which is threaded into a horizontal bridge arm 134 (FIG. 1) of approximately inverted U-shaped configuration. The outer end of the bridge arm 134 is bored in alignment with the bolt 132 to receive a second bolt 136 threaded into a lower ball nut 138, the connections of which are described below. The block 126 on its upper side is provided with a socket 140 in which a tubular spring casing 142 is bolted or otherwise secured. Access openings 144 and 146 through the block 126 and spring casing 142 respectively provide access to the head of the bolt 132, which is preferably of the so-called Allen type.

Threaded into the upper end of the tubular spring casing 142 is a screw plug 148 which is bored centrally at 150 for the passage of the upper end portion of the stepped shaft 120. The screw plug 148 serves as an upper abutment for a calibrated compression loading spring 152 coiled around the upper portion of the stepped shaft 120 and at its lower end engaging an abutment washer 154 mounted on a shoulder of the stepped shaft 120. Springs 152 of different loading capacities are interchangeable thereon, such as those of 100, 200, 300, 400 and 800 pounds capacity, depending upon the characteristics of the soil to be tested. The upper end of the bore 150 is counterbored as at 156 to receive a bearing 158 for slidably supporting the upper end of the stepped shaft 120. The side wall of the tubular spring casing 142 is provided with an elongated longitudinal slot 160 to provide clearance for the relative up-and-down motion between the bridge arm 134 and the upper assembly 14 and to prevent rotation of the shaft 120.

Also secured to the tubular spring casing 142 and bored for the passage thereof is a bracket arm 162 (FIG. 1) which is bored vertically to receive the threaded stud 164 projecting downward from the lower end of an upright 166 which is held in position by a nut 168 which also holds down against the bracket arm 162 an upper supporting plate 170. Projecting upward from the upper end of the upright 166 is a threaded stud 172 on which is threaded a nut 174 serving to hold down an upper bracket plate 176 against the upper end of the upright 166. The upper bracket plate 176 is bored vertically to receive an upper bearing 178 for the upper end of a rotary fast-thread upper screw shaft 180, preferably of the so-called ball screw type. Threaded onto the screw shaft 180 is a correspondingly-threaded upper ball nut 182 having bearing balls (not shown) engaging the helical troughs or grooves in the screw shaft 180. Secured to and projecting horizontally from the nut 182 is a scriber arm 184, the outer end of which carries a suitable scriber, such as a pencil or pen. The supporting plate 170 is drilled in alignment with the upper bracket plate 176 to receive a bearing 186 which rotatably supports the lower end portion of the upper screw shaft 180 which passes downward through the bracket arm 162 and has keyed or otherwise secured to its lower end a pinion 188.

The pinion 188 meshes with an idler pinion 190 keyed or otherwise secured to an idler shaft 192 which is rotatably supported at its upper and lower ends in bearings 194 and 196 located respectively in the upper supporting plate 170 and in a lower supporting plate 198 bolted or otherwise secured to the underside of the supporting block 126. The upper and lower supporting plates 170 and 198 are provided with bearings 200 and 202 respectively which rotatably support the upper and lower ends of a lower fast-thread screw shaft 204 which the lower ball nut 138 threadedly engages, as by means of bearing balls (not shown) engaging the grooves or troughs of the screw shaft 204. Keyed or otherwise drivingly secured to the upper portion of the screw shaft 204 is a gear 205 meshing with the idler pinion 190.

The upper supporting plate 170 is bored near its outer end to support a stepped vertical pintle 206, the lower end of which is threaded for engagement by a retaining nut 208 (FIG. 1). Rotatably mounted upon the pintle 206 in upper and lower bearings 210 and 212 respectively are the upper and lower end heads 214 and 216 respectively of a recording drum 218 having a cylindrical side wall 220 bolted or otherwise secured to the end heads 214 and 215, which are in the form of discs. Secured to and rising from the lower end head 216 is a double spring clip 222 adapted to hold a record sheet of paper or other flexible material firmly against the cylindrical side wall 220 of the recording drum 218 as a scriber 224 on the scriber arm 184 inscribes a record thereon. The lower end head 216 is provided with an annular cable track or groove 226 around which is wound a flexible cable 228 anchored at 230 within a recess 232 in the bottom of the lower end head 216. The lower end head 216 and upper supporting plate 170 are drilled to receive the perpendicularly-bent opposite ends of a torsion spring 234, the convolutions of which are wound around the stationary pintle 206. The flexible cable 228 is trained around pulleys 236 rotatably supported upon a Z-shaped bracket 238 bolted or otherwise secured to the upper supporting plate 170 and passes downward to an anchorage on an anchor bracket 240, to one of the leg brackets 22 on the tubular lower housing 20 of the stationary lower assembly 12.

In the operation of the penetration and shear measuring instrument 10 of the invention, let it be assumed that the penetrability of a selected portion of terrain is to be measured for the purpose, for example, of ascertaining whether it would properly sustain the weight of a building or vehicle or be sufficiently stable to support a road, bridge abutment or the like. The soil of such a selected portion of terrain which is to be measured may, for example, be damp earth, swamp soil, sand, peat, clay or the like. Before making any measurement, the operator winds up the torsion spring 234 by grasping the recording drum 218 and rotating it. The flexible cable 228 is assumed to be wound around the cable groove 226, trained around the pulleys 236 and directed downward to the anchor bracket 240 to which its lower end is tied or otherwise secured.

The operator now pushes downward upon the hand lever 54, causing the vertically-movable upper assembly 14 to move downward so as to compress the calibrated loading spring 152 until the load thereof is high enough to overcome the soil resistance and move the thrust washer 154 and the nonrotatable shaft 120 downward. To obtain the most complete results, the operator continues to push downward upon the lever 54 until it reaches the limit of its motion.

Assuming that the jaw clutch 86 is in its open or unlocked position shown disengaged in FIG. 2, the downward motion of the upper stepped shaft 120 caused by the compression of the loading spring 152 is transmitted to the screw shaft 112 through the thrust bearing 122 and thence from the screw shaft 112 to the sinkage plate shaft 70 and sinkage plate 76, pushing the sinkage plate 76 in a straight line downward into the soil to be tested. As the screw shaft 112 moves downward, its engagement with the nut rollers 104 causes the nut 108 to rotate the tubular shaft 62 freely in the antifriction bearings 58 and 60. At the same time, the downward motion of the supporting plates 170 and 198 moves the lower screw shaft 204 downward through the lower ball nut 138 and imparts rotary motion to the lower screw shaft 204, rotating the gear 205 keyed thereto and thence rotating the pinion 188 and upper screw shaft 180 through the upper ball nut 182 to the scriber arm 184 in an approximately four-to-one ratio of multiplication. This action causes the scriber 224 to record the force in a vertical direction.

Meanwhile, the downward motion of the upper assembly 14 including the recording drum 218 has caused the torsion spring 234 to unwind to take up the slack in the lower portion of the flexible cable 228. As the drum 218 rotates, the scriber 224 inscribes a line or graph on the record sheet held thereon by the spring clips 222. When the sinkage plate 76 terminates its penetration of the soil being tested, the consequent halting of the screw shaft 112 and stepped shaft 120 causes the consequent halt in the downward travel of the supporting plates 170 and 198 and lower screw shaft 204.

To measure the shear characteristics of the soil, the operator pushes the clutch handle 94 downward so as to engage the upper teeth 80 with the lower teeth 78 of the jaw clutch 86, whereupon he shifts the handle 94 circumferentially into the horizontal notch 98 of the J-slot 96, locking it in that position. The operator then repeats the foregoing procedure by pushing downward again on the hand lever 54 to again compress the loading spring 152 and again move the stepped shaft 120 and screw shaft 112 downward together with the supporting plates 170 and 198 and lower screw shaft 204. This time, however, the tubular shaft 62 is locked against rotation by the jaw clutch 86, as a result of which the engagement of the nut rollers 104 of the lockable rotary nut 108, being locked, causes the screw shaft 112 to rotate by the engagement of the rollers 104 with the helical groove 110 of the screw shaft 112. As a consequence, the sinkage plate shaft 70 and sinkage plate 76 are caused to rotate as they are moved downward, thereby exerting a shearing force upon the soil. The foregoing motion is, as before, transmitted to the supporting plates 170 and 198 and ball screw 204, again rotating the lower screw shaft 204 as it moves downward through the ball nut 138, rotating the gearing 205, 190, 188, upper screw shaft 180 and moving the upper ball nut 182 and the scriber arm 184, causing the scriber 225 to inscribe a graph upon the recording drum record sheet. By measurements made upon the rectangular coordinates of the graphs thus inscribed upon the record sheet on the recording drum 218, the operator can readily determine the direct penetration and shear characteristics of the soil under test.

Both of the curves thus obtained are recorded on the same recording graph sheet which is graduated horizontally in inches of sinkage, say from 0 to 7 inches, and graduated vertically in pounds by force, say from 0 to 200 pounds. The straight sinkage test has to be made first, followed by the sinkage-and-shear test, in order to determine what percentage of the sinkage-and-shear test is straight sinkage and what percentage is shear alone. This is arrived at by the difference between the two curves, using the torque transformation formula.

I claim:

1. An instrument for measuring and recording the direct and shear penetration strengths of soils, comprising a stationary supporting structure adapted to rest upon the ground, a screw shaft, means for mounting said screw shaft in said supporting structure for either rectilinear or helical longitudinal motion downward relatively to said supporting structure, means for selectively permitting or preventing helical motion of said screw shaft during travel thereof downward relatively to said supporting structure, a soil penetrator adapted to engage the soil and operatively connected to said screw shaft for motion unitarily therewith, a longitudinally movable force-transmitting member engaging said screw shaft, means for resiliently applying a predetermined force to said force-transmitting member, a movable structure mounted adjacent said force-transmitting member in rotation-preventing relationship therewith for longitudinal motion relatively thereto and to said stationary structure and abuttingly engaging said resilient force-applying means, a record carrier mounted for rotation upon said movable structure, means responsive to the motion of said movable structure relatively to said stationary structure for rotating said record carrier, a scriber mounted adjacent said record carrier for motion relatively thereto and adapted to inscribe a record thereon, and means mounted on said movable structure and responsive to the relative motion between said movable structure and said force-transmitting member for moving said scriber relatively to said record carrier.

2. A penetration measuring instrument, according to claim 1, wherein said selection means includes a nut structure freely rotatable in said supporting structure and threadedly engaging said screw shaft, and a clutch device selectively locking and unlocking said nut structure respectively to and from said stationary supporting structure.

3. A penetration measuring instrument, according to claim 1, wherein said force-transmitting member includes a shaft nonrotatably mounted in said movable structure, and wherein means is provided for preventing relative rotation between said shaft and said movable and stationary structures.

4. A penetration measuring instrument, according to claim 1, wherein said responsive means includes motion-multiplying mechanism carried by said movable structure and operatively connected to said scriber and to said force-transmitting member.

5. A penetration measuring instrument, according to claim 1, wherein said record carrier comprises a drum, wherein an elongated flexible element is secured at one end to said drum in encircling relationship therewith, and wherein the opposite end of said flexible element is anchored to said stationary supporting structure.

6. A penetration measuring instrument, according to claim 5, wherein a torsion spring is operatively connected between said drum and said movable structure in rotation-opposing relationship to said flexible element.

7. A penetration measuring instrument, according to claim 5, wherein said responsive means includes motion-multiplying mechanism carried by said movable structure and operatively connected to said scriber and to said force-transmitting member.

8. A penetration measuring instrument, according to claim 7, wherein an arm member is secured transversely to said movable force-transmitting member and wherein said motion-multiplying mechanism is mounted on said movable structure between said scriber and said arm member and is operatively connected to said scriber and to said arm member.

9. A penetration measuring instrument, according to claim 7, wherein said motion-multiplying mechanism also includes a fast-thread shaft rotatably mounted on said movable structure, and a fast-thread nut non-rotatably mounted on said arm in threaded engagement with said fast-thread shaft.

References Cited

UNITED STATES PATENTS

| | | | |
|---|---|---|---|
| 1,040,240 | 10/1912 | Reed et al. | 73—312X |
| 2,130,751 | 9/1938 | Van der Meer | 73—84 |
| 2,709,363 | 5/1955 | Lea | 73—89 |
| 2,833,144 | 5/1958 | Miller | 73—84 |
| 3,465,576 | 9/1969 | Spanski | 73—84 |
| 2,607,218 | 8/1952 | Hansen | 73—84 |
| 3,175,392 | 3/1965 | Thardson | 73—84 |

RICHARD C. QUEISSER, Primary Examiner

C. E. SNEE III, Assistant Examiner

U.S. Cl. X.R.

74—89.14